Dec. 23, 1958 T. A. HANSEN 2,865,996

SYNCHRONIZER FOR TELEGRAPH RECEIVERS

Filed Dec. 28, 1955

6 Sheets-Sheet 1

INVENTOR
THEODORE A. HANSEN

BY Emery Robinson
ATTORNEY

Dec. 23, 1958 T. A. HANSEN 2,865,996

SYNCHRONIZER FOR TELEGRAPH RECEIVERS

Filed Dec. 28, 1955

6 Sheets-Sheet 2

INVENTOR
THEODORE A. HANSEN
BY Emery Robinson
ATTORNEY

Dec. 23, 1958 T. A. HANSEN 2,865,996

SYNCHRONIZER FOR TELEGRAPH RECEIVERS

Filed Dec. 28, 1955

6 Sheets-Sheet 3

INVENTOR
THEODORE A. HANSEN
BY Emery Robinson
ATTORNEY

Dec. 23, 1958

T. A. HANSEN 2,865,996

SYNCHRONIZER FOR TELEGRAPH RECEIVERS

Filed Dec. 28, 1955

6 Sheets-Sheet 4

INVENTOR
THEODORE A. HANSEN

BY Emery Robinson
ATTORNEY

Dec. 23, 1958 T. A. HANSEN 2,865,996

SYNCHRONIZER FOR TELEGRAPH RECEIVERS

Filed Dec. 28, 1955

6 Sheets-Sheet 5

INVENTOR
THEODORE A. HANSEN

BY Emery Robinson
ATTORNEY

INVENTOR
THEODORE A. HANSEN
BY Emery Robinson
ATTORNEY

United States Patent Office 2,865,996

Patented Dec. 23, 1958

2,865,996

SYNCHRONIZER FOR TELEGRAPH RECEIVERS

Theodore A. Hansen, Park Ridge, Ill., assignor to Teletype Corporation, Chicago, Ill., a corporation of Delaware Application December 28, 1955, Serial No. 555,909

12 Claims. (Cl. 178—53)

Figure 1:
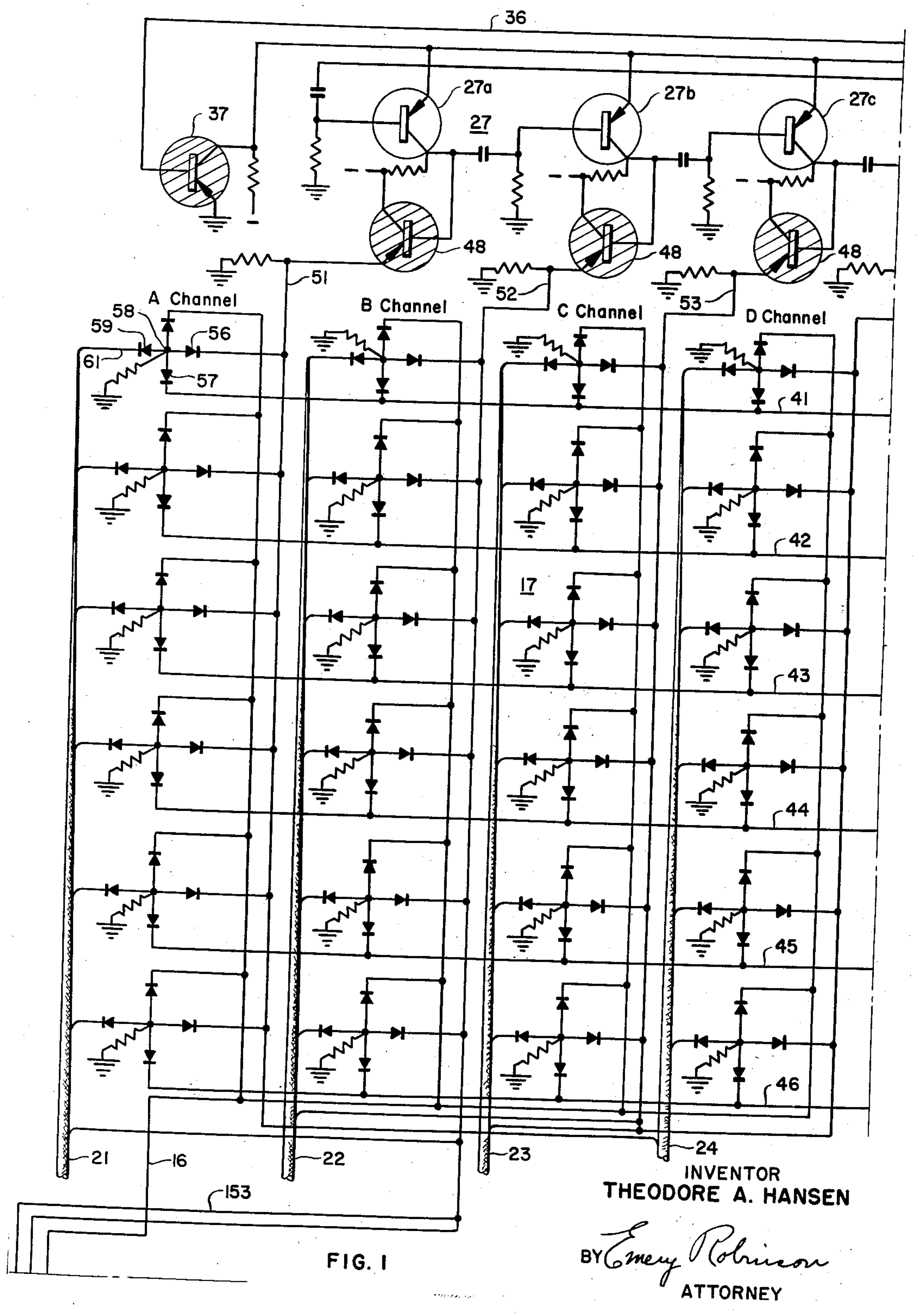
Figure 2:
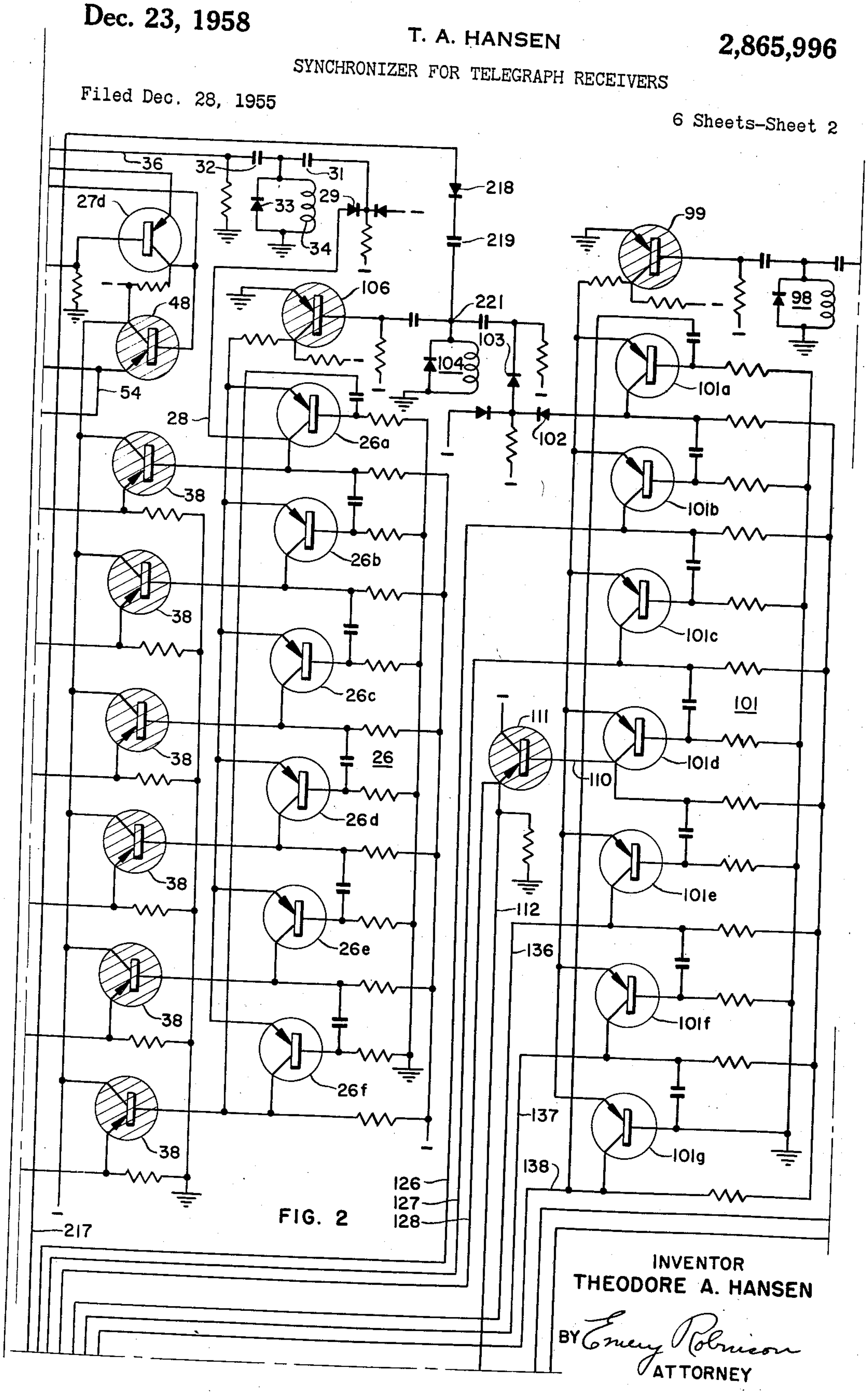
Figure 3:
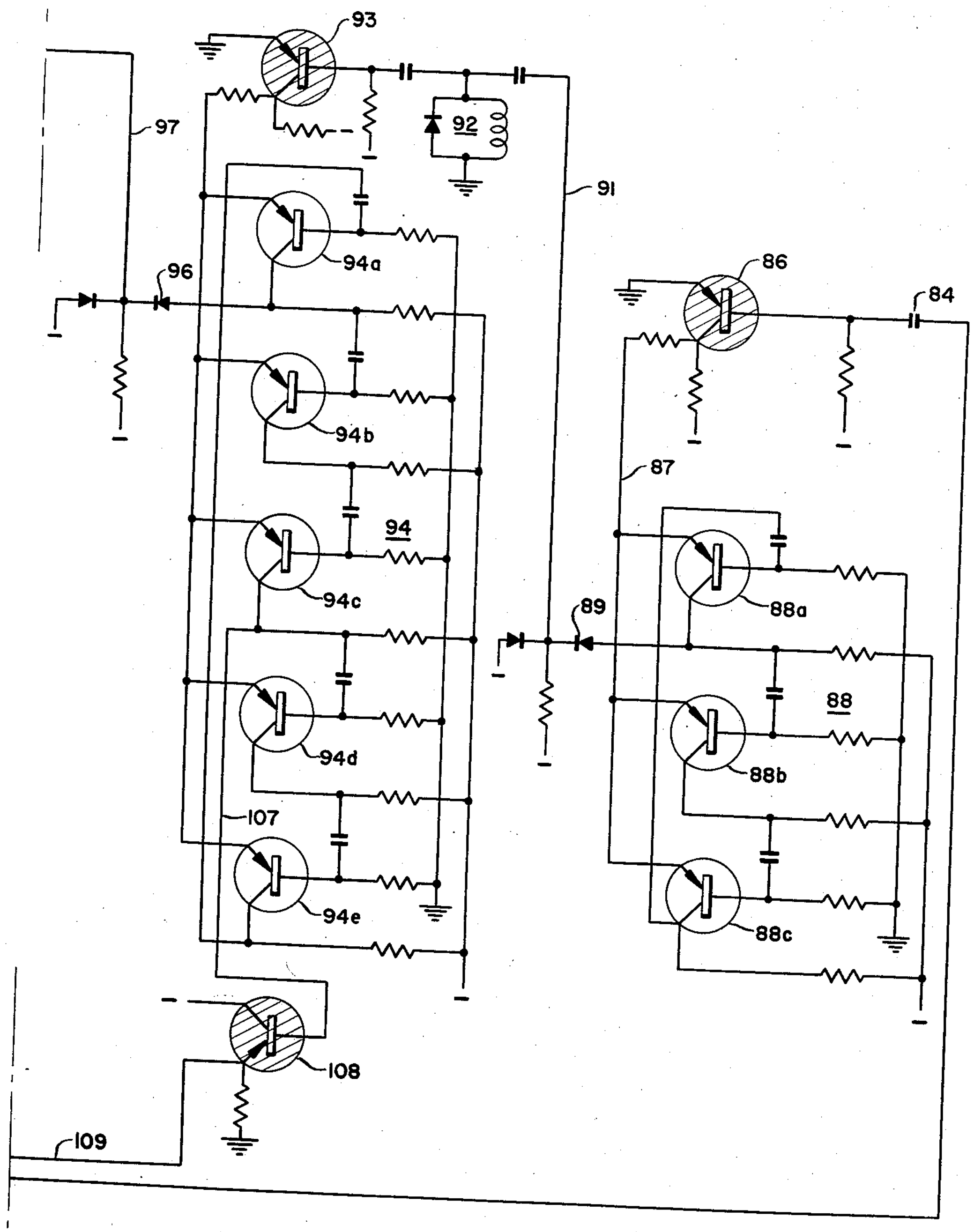

This invention relates to telegraph systems employing synchronized transmitters and receivers and more particularly to facilities in such systems for maintaining a multiplex or other receiver in synchronism with respect to the receipt of telegraph signal impulses.

In multiplex operation of telegraph systems on a time division basis the usual practice is to employ a plurality of transmitters that are sequentially and successively connected through a distributor to a single communication channel. At the receiving end of the system a like number of receiving devices are sequentially and successively connected through the agency of a receiving distributor to the single communication channel. In order to save valuable communication line time no synchronizing pulses are transmitted with the signals but rather each distributor is operated by devices running at substantially the same speed. Heretofore variations in the speed of the driving devices with respect to the speed of the receipt of the signals have been compensated by electromechanical and electronic devices adapted to alter the speed of a driving motor, tuning fork or oscillator.

In the present invention a receiving distributor is provided having as control elements devices known as transistors. Two types of transistors are used; the first being a point contact transistor of the general type shown in the patent to Bardeen et al., No. 2,524,035, and the second a junction type transistor of the general type shown in the patent to Shockley, No. 2,569,347. The point contact transistors are used in the distributors and frequency dividers whereas the junction type transistors are utilized in the binary and univibrator circuits as well as in the amplifying circuits. The receiving distributor is adapted to operate on a time division basis to supply incoming telegraph signals to a bank of code converters of the type shown in the copending application of R. J. Reek, Serial No. 542,735, filed October 25, 1955.

It is a primary object of the present invention to provide a transistor controlled multiplex receiving distributor having facilities therein for maintaining synchronous operation with respect to the receipt of multiplex type telegraph signals.

Another object of the invention resides in the provision of a constant frequency drive device for operating a multiplex receiving distributor wherein drive pulses can be added or subtracted to maintain synchronism without interfering with the operation of the constant frequency device.

A further object of the invention resides in a very stable synchronizing device having facilities therein for comparing each received signal impulse with a locally generated constant frequency pulse and upon any variation therebetween pulses are added or subtracted from a train of constant frequency drive pulses to restore synchronization.

An additional object of the invention is to provide a constant frequency drive source that applies pulses to a pair of gating circuits which are selectively controlled to maintain synchronism between a series of received signal impulses and the frequency of operation of a receiving device.

With these and other objects in view the present invention contemplates a receiving multiplex distributor having a plurality of gating circuits which are successively conditioned for operation in concordance with the receipt of multiplex telegraph signals. Outputs from the gating circuits are selectively applied to a bank of receiving utilization apparatuses. A constant frequency oscillator drives through a pair of gating circuits a series of frequency dividers that provide drive pulses to operate an impulse distributor and a channel distributor. As each transition from a spacing to a marking signal condition is received a special comparing pulse of predetermined width is generated. This special pulse is compared with the output of one of the frequency dividers. If the system is operating in synchronism then the special pulse will coincide with one of the output pulses from the frequency divider and no correction will be made.

However, if the signals are lagging the rate of operation of the receiving distributor, then there will be a coincidence between the special pulse and one of a group of outputs from the frequency divider. This coincidence effectuates a control of one of the gating circuits to subtract one of the drive pulses coming from the oscillator. This mode of operation continues until the receiving distributor is slowed down to a point where synchronism between incoming signals and the distributor is restored. In the situation where the incoming signals are being received at a faster rate than the receiving distributor is operated then a coincidence will occur between the special comparing pulse and another of a group of pulses coming from the frequency divider. This condition results in the actuation of the other gating circuit to effectuate the addition of drive pulses to speed up the receiving distributor to again restore the desired synchronization between received signals and the operation of the multiplex receiver.

Inasmuch as a crystal controlled oscillator is utilized the variation in synchronization during normal operation is at a very slow rate. Consequently, the expedients used to effectuate a restoration of synchronization operate at a very slow rate. Facilities are also provided to speed up the rate of correction during initial operation of the system when additional facilities are being operated to establish initial phasing condition between the received signals and the operation of the gating circuits in the receiving distributor.

Figure 6:
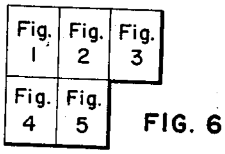
Figure 7:
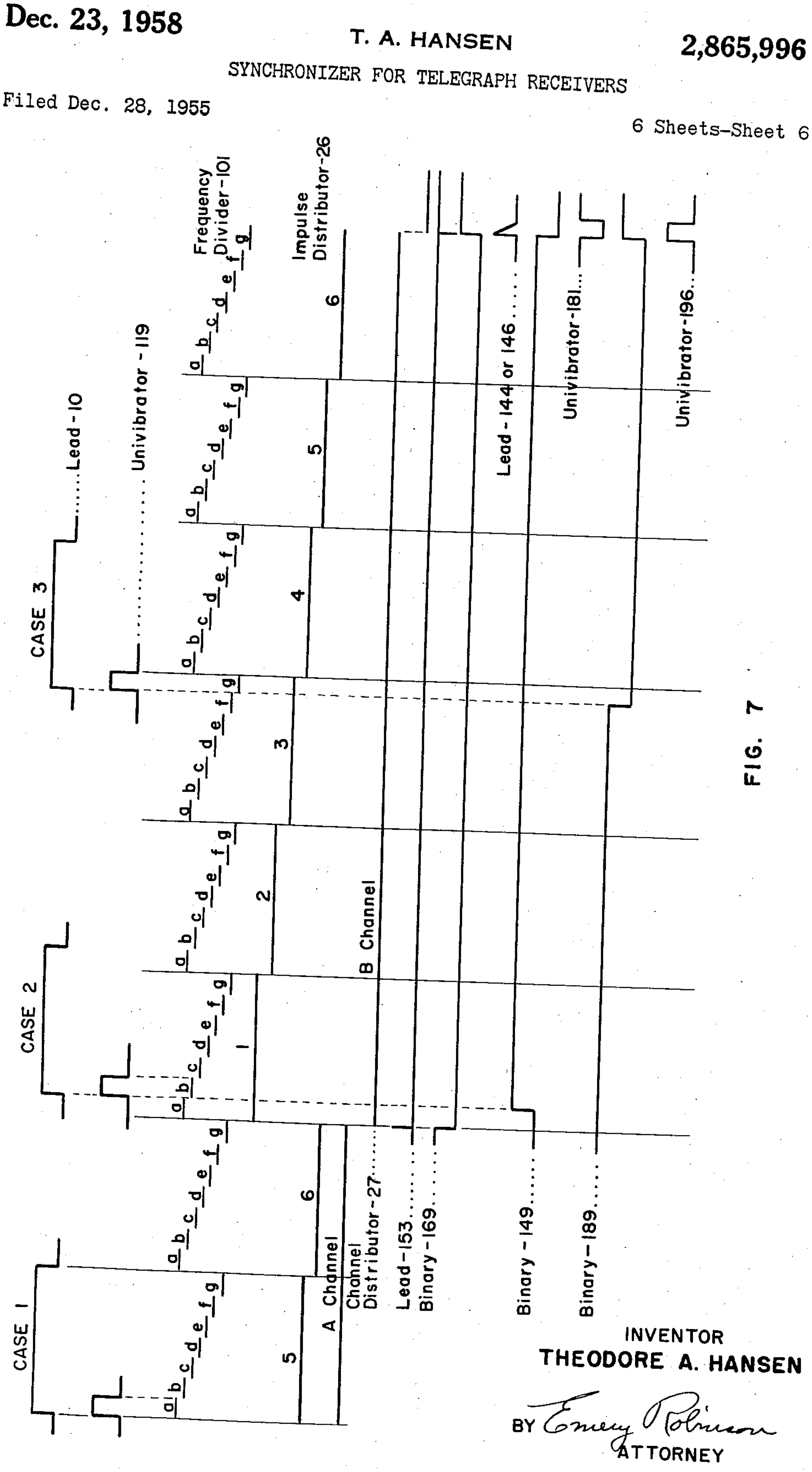

Other objects and advantages of the present invention will be apparent from the following detailed description when considered in conjunction with the accompanying drawings wherein:

Figs. 1, 2, 3, 4 and 5 when assembled in the manner shown in Fig. 6 illustrate a transistor controlled receiving multiplex distributor having facilities therein for maintaining synchronous operation in accordance with the principles of the present invention; and Fig. 7 is a timing diagram showing the operating characteristics of certain critical elements during operation of the synchronizing correction facilities.

Referring to the drawings when assembled in the manner taught in Fig. 6 there is shown a great number of circled transistors. The shaded circles indicate that the transistor located therein is normally biased into a conductive state, whereas the nonshaded circles indicate that the transistors located therein or normally biased into a a state of nonconduction or that the condition of the particular transistor is contingent upon the receipt of a driving or operating pulse.

Figure 4:
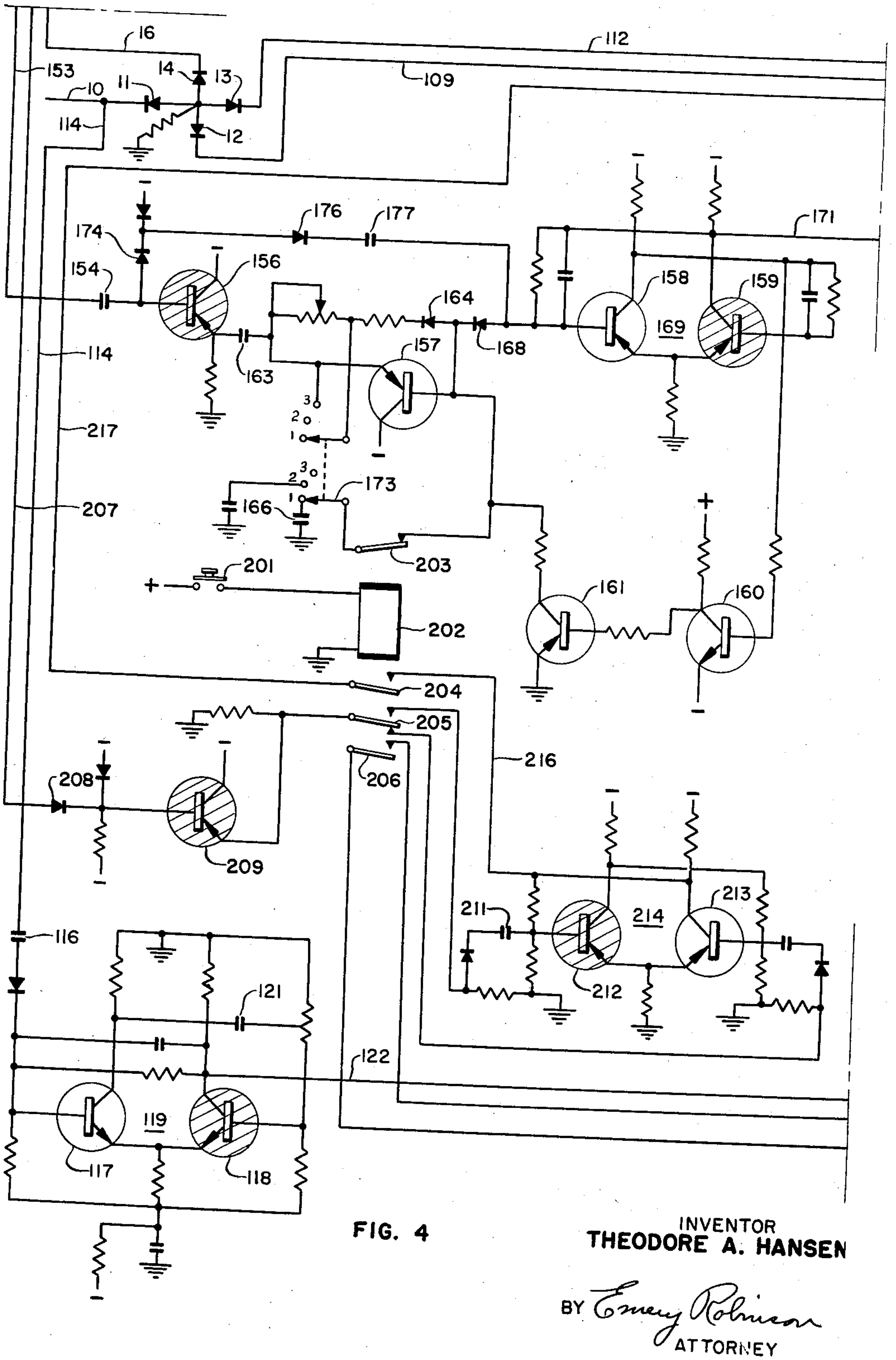
Figure 5:
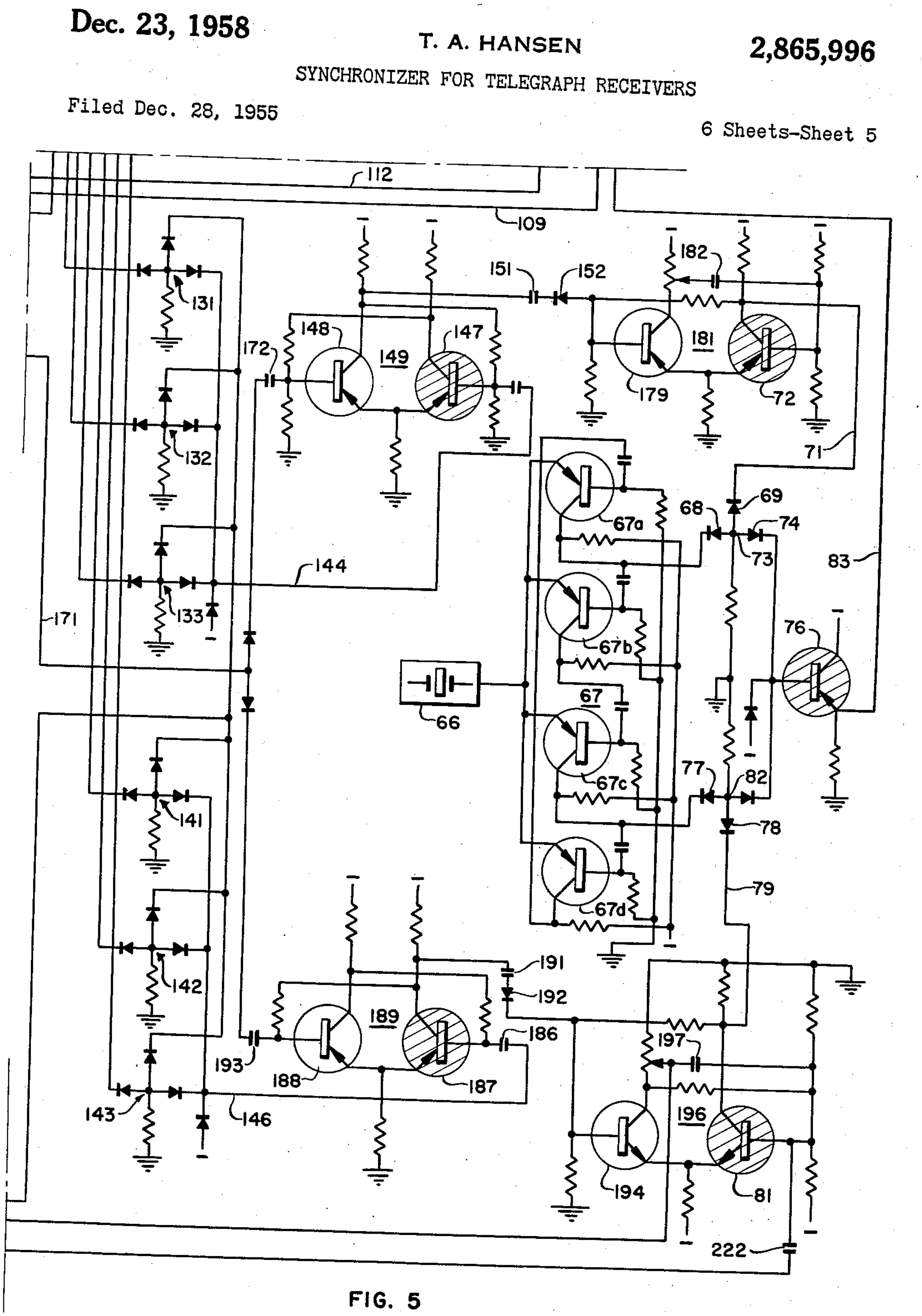

Referring to Fig. 4 the incoming multiplex telegraph signals are impressed on a single lead 10. Each signal consists of five permutatively arranged marking (current) or spacing (no current) impulses together with an accompanying sixth control impulse that is invariably of a marking character. A transmitter for generating such signals is shown in the patent to T. A. Hansen, No. 2,609,451, issued September 2, 1952. As each succeeding signal impulse is received it is applied to a coincident gating circuit consisting of diodes 11, 12 and 13 which function to sample the potential condition of the approximate center of each perfect signal impulse. If the signal impulse is of a marking character and the diodes 12 and 13 have increased sampling potential conditions impressed thereon then an output pulse of instantaneous duration is impressed through a diode 14 and over a lead 16 to a receiving matrix circuit generally designated by the reference number 17 (Fig. 1).

The illustrated system is designed for four channel operation, therefore facilities in the form of twenty-four coincident gates are provided in the matrix 17. These coincident gates are adapted to apply over cables 21, 22, 23 and 24 the six signal impulses of each signal to four appropriate receiving devices that may be of the type shown in the copending application of R. J. Reek, Serial No. 542,735, filed October 25, 1955. Each coincident gate in the matrix 17 is adapted to be successively conditioned for operation by the concurrent operation of a stage in each of two multistage distributors 26 and 27. The distributor 26, termed an impulse distributor, consists of six transistors 26*a*, 26*b*, 26*c*, 26*d*, 26*e* and 26*f* interconnected together to form a closed ring and connected to suitable sources of potential so that only one transistor is conducting at any one time. The details of the construction and the mode of operation of this type of distributor are disclosed in the copending application of R. A. Slusser, Serial No. 349,637, filed April 20, 1953. For purposes of understanding this invention it is only necessary to realize that the operative stage of the distributor is stepped along by applying a driving pulse to a circuit common to the emitters of all the transsistors. Receipt of such a driving pulse effectuates shutting off of the conducting transistor and the resulting drop in collector potential of this transistor is impressed through a capacitance circuit to the base of the next succeeding transistor to place this latter transistor in a conductive state.

The distributor 27 designated a channel distributor consists of four transistors 27*a*, 27*b*, 27*c* and 27*d* connected together and biased in the same manner as the transistors in distributor 26. In this instance the distributor 27 is stepped by a negative going pulse that is developed when the transistor 26*a* is rendered conductive to cause its collector potential to rise. This rise is impressed over a lead 28, through a germanium diode 29 to a ringing circuit consisting of serially connected condensers 31 and 32 and a diode 33 connected in parallel with an inductance 34. The ringing circuit responds to the rise in potential by producing a positive going voltage spike that is impressed over a lead 36 to the base of a normally conducting emitter follower PNP junction type transistor 37. Immediately thereupon the transistor 37 is driven towards a state of nonconduction resulting in instantaneous drop in its collector potential. The collector of transistor 37 is connected to the common emitter circuit of the transistors 27*a*, 27*b*, 27*c* and 27*d*; consequently, the drop in collector potential results in the conducting transistor stage of the distributor 27 being shut off and the next succeeding transistor stage being rendered conducting.

As each transistor stage of the distributor 26 is operated, a normally conducting emitter follower transistor amplifier 38 associated therewith is driven towards nonconduction causing a rise in its respective emitter potential. These rises in potential are successively impressed on horizontal cross leads 41, 42, 43, 44, 45 and 46, each of which is respectively connected to a series of germanium diodes forming elements of the coincident gates in the matrix 17. As each transistor stage of the channel distributor 27 is operated a normally conducting emitter follower transistor amplifier 48 associated therewith is driven towards a state of nonconduction thereby effectuating a rise in potential on its emitter. The emitters of the transistors 48 are connected to a series of four vertical cross channel leads 51, 52, 53 and 54 each running to a series of diodes forming second control elements for each coincident gate in the matrix 17. The four receiving channels are further designated in the drawing by the reference letters A, B, C and D. It may be readily comprehended that the operation of one of the transistors 27 conditions a first group of coincident gates for operation and that the operation of the transistors 26 successively further conditions each coincident gate in the conditioned group.

Now assume that transistors 26*a* and 27*a* have operated and that the first received signal impulse on the lead 10 is of marking character. When the sampling coincident gates 11, 12 and 13 operate to produce a positive going pulse, this pulse will be applied over the lead 16 to all the conicident gates in the matrix 17, however, since only transistors 26*a* and 27*a* have operated, the only coincident gate that will operate is the one having diodes common to these operating transistors. In Fig. 1 these diodes are respectively designated by the reference numbers 56 and 57. A junction point 58 will thereupon be raised in potential value to impress a potential rise through an output diode 59, over a lead 61, to the cable 21. If the signal impulse impressed on lead 10 were of a spacing character the coincident gate including the diodes 56 and 57 would not be operated and the junction point 58 would remain at a low potential condition to cause a spacing condition to be impressed over lead 61 to the cable 21.

As each succeeding signal impulse of a complete multiplex signal, associated with the A channel, is received the coincident gates associated with the conditioned first channel lead 51 will be successively operated by the successive operation of the transistor stages of the distributor 26. In a like manner when the signals associated with the second, third and fourth channels of communication are received, coincident gates associated respectively with the vertical cross channel leads 52, 53, and 54 are first conditioned by the operation of the transistors 27*b*, 27*c*, and 27*d* respectively and then further successively conditioned by the application of potential rises over the impulse horizontal cross leads 41 to 46, inclusive. Manifestly, as each succeeding signal impulse is received it is accordingly successively routed by the conditioned coincident gate over an associated output lead running to the proper cable 22, 23 or 24.

In a perfectly synchronized communication system the impulse distributor 26 would operate at the exact same frequency that the incoming signal impulses are received. It may be readily appreciated that nonsynchronous operation of the distributors would result in the conditioning of improper coincident gates causing the improper routing of the impulses to the receiving apparatuses. In order to maintain synchronous operation it is necessary that the drive means for the signal impulse distributor 26 operate at the same frequency as the frequency at which the signal impulses are being received over lead 10.

In the present invention the drive means for the distributor 26 comprises a crystal oscillator 66 (see Fig. 5) that emanates negative pulses at substantially a constant frequency. These pulses are applied to a common emitter lead of a frequency divider 67 consisting of transistors 67*a*, 67*b*, 67*c* and 67*d* interconnected to form a closed ring similar to the distributor rings 26 and 27 and further described in the afore-identified copending Slusser application. When transistor 67*a* is rendered conducting in a cycle of operation of the frequency divider 67, an increased potential condition is impressed on a diode 68.

This diode and a diode 69 form a coincident gate that is operated when both diodes have increased potential conditions applied thereto. Diode 69 is normally maintained at a relatively high potential condition by the potential applied over a lead 71 from the collector of a normally conducting transistor 72. Simultaneous application of increased potentials to the diodes 68 and 69 results in elevation of the potential on a junction point 73 to cause an increased potential condition to be impressed through a diode 74 to the base of a normally conducting emitter follower type transistor amplifier 76.

It will be noted that the collector of transistor 67*c* is also connected to a coincident gating circuit comprising diodes 77 and 78. However, this gating circuit does not produce an output since the diode 78 has applied thereto a relatively high negative potential condition over a lead 79 running from the collector of a normally conducting NPN type transistor 81. The low potential condition of the collector of this conducting transistor is established by the negative battery connected to its emitter. When transistor 67*c* operates, a junction point 82 of the associated coincident gate is held at a relatively low value and consequently the conduction of transistor 67*c* is ineffective to change the conductive state of the transistor 76.

When the transistor 67*a* operates to apply a positive pulse to the base of the transistor 76 and thereby drive this transistor into a state of nonconduction, the emitter potential thereof rises to impress an increased potential condition over a lead 83, through a differentiating condenser 84 to the base of a normally conducting transistor drive pulse amplifier 86. Instantaneously therewith the transistor 86 is rendered nonconductive and its collector potential drops to impress a negative going pulse over a lead 87 to a common emitter lead of a second frequency divider 88 having three transistor stages 88*a*, 88*b* and 88*c*. During each complete cycle of operation of the frequency divider 88, the transistor 88*a* is rendered operative and the accompanying rise in its collector potential is impressed through a diode 89, over a lead 91 to a ringing circuit 92 wherein a positive going voltage spike is produced. This voltage spike effectuates a reduction in the conductivity of a transistor amplifier 93. The accompanying drop in collector potential of this transistor is impressed on a common emitter lead of a third frequency divider 94 similar in construction to the frequency dividers 67 and 88 but consisting of five stages 94*a*, 94*b*, 94*c*, 94*d* and 94*e*.

When transistor 94*a* operates, upon the receipt of each five negative going pulses on the common emitter lead of this distributor, an increase in collector potential of transistor 94*a* is impressed through a diode 96 over a lead 97 to a ringing circuit 98 wherein a positive going voltage spike is produced. This spike effectuates a reduction in conductivity of a transistor amplifier 99 resulting in a drop in its collector potential which is impressed on a common emitter lead of a fourth frequency divider 101 comprising seven transistor stages 101*a*, 101*b*, 101*c*, 101*d*, 101*e*, 101*f*, and 101*g*. These transistor stages are coupled together in a manner similar to the interconnection of the stages of the frequency dividers 67, 88 and 94.

Upon each actuation of the transistor 101*a* its collector potential will rise to impress an increased potential condition through the diodes 102 and 103 to a ringing circuit 104 wherein a positive going voltage spike is produced. Instantaneously therewith the voltage spike will reduce the conductivity of an emitter follower transistor amplifier 106. The accompanying drop in collector potential of this transistor is impressed on the common emitter lead of the signal impulse distributor 26.

It will be understood that the fundamental frequency of the oscillator 66 is selected so that when the output therefrom is divided by the frequency dividers 67, 88, 94 and 101 the resultant frequency at which the impulse distributor 26 is driven is equal to the frequency of the incoming signal impulses. With the present arrangement the fundamental frequency is divided 420 times but if signal impulses are to be received at different frequencies it is only necessary that the frequency of the oscillator be changed or the number of stages in the frequency dividers be accordingly changed.

In order to sample the incoming signals to obtain a truly representative indication of the character of each signal the coincident gate including the diodes 11, 12 and 13 is actuated at the approximate center of a perfect signal. In order to accomplish this desirous result, a lead 107 (Fig. 3) is connected to the collector of transistor 94*c* of frequency divider 94 so that actuation of this transistor causes an increased potential condition to be impressed on the lead. This action results in a reduction in the conductivity of a normally conducting emitter follower transistor amplifier 108 causing an accompanying rise in emitter potential to be impressed over a lead 109 to the diode 12. Further, when transistor 101*d* of frequency divided 101 operates the accompanying rise in collector potential is applied over a lead 110 to effect a reduction in the conductivity of an emitter follower transistor amplifier 111. Upon transistor 111 being driven towards a state of nonconduction its emitter potential will rise to impress an increased potential condition over a lead 112 running to the diode 13. It will be appreciated that the transistor 94*c* operates at a time which is approximately at the midpoint of the time of conduction of one of the transistors in the frequency divider 101. It will be further appreciated that the transistor 101*d* operates at the time which is approximately at the midpoint of the time at which one of the transistors in the signal impulse distributor 26 is operated. The time at which both leads 109 and 112 have increased potential conditions applied thereto to condition the diodes 13 and 12 is a very finite increment of time that occurs at the approximate midpoint in the period during which a transistor 26 is operated and a signal impulse is being received.

In order that the received signal impulses are always in synchronism with the drive impulses for the signal impulse distributor 26 a comparison is made between each new marking signal impulse and a pulse generated by the frequency divider 101. If any variance is ascertained facilities are operated to control the gating circuits associated with the oscillator 66 to either add or subtract drive pulses going to the frequency divider 88.

More particularly, as each space to mark transition is impressed on the incoming line 10 the transition is also applied to a lead 114 causing a differentiating condenser 116 to produce a positive going pulse. This pulse is applied to the base of a normally non-conducting NPN type transistor 117, thereby causing said transistor 117 to assume a heavy state of conduction. Transistor 117 and a transistor 118 are cross coupled to form a one-shot multivibrator or univibrator 119 having a timing characteristic determined by the capacitance value of a condenser 121. During the operation of the univibrator 119 the transistor 118 is in a quiescent state and the potential on a lead 122 rises. The capacitance value of the condenser 121 is selected so that the increased potential condition is impressed on lead 122 for a period of time equal to the time that one of the transistors in the frequency divider 101 is operated. It may be appreciated that if a perfect signal in synchronism with the receiving apparatus is received, then the rise in potential on lead 122 always occurs at the same time that the transistor 101*a* operates to advance the operative stage of the impulse distributor 26 to start a period in which a coincident gate in the matrix 17 is conditioned to receive the signal impulse. When this coincidence of operation occurs then a situation of synchronism exists and no further action results.

However, if there is a variance in the operation of the univibrator 119 with the operation of the transistor 101*a* then there is a condition of nonsynchronous operation which if permitted to persist, may eventually result in the conditioning of improper coincident gates in the matrix 17 during the receipt of the signal impulses. Considering the specific means for correcting the receiver during nonsynchronous operation, it will be noted that the collectors of the transistors 101*b*, 101*c* and 101*d* (through transistor amplifier 111) are connected over leads 126, 127 and 128 respectively to similar, left-hand diodes in a set of coincident diode gates 131, 132 and 133. Further, it will be noted that the collectors of transistors 101*e*, 101*f* and 101*g* are respectively connected over leads 136, 137 and 138 to a set of coincident diode gates 141, 142 and 143 in a similar manner. The lead 122 from the univibrator 119 is connected to a second, upper diode in each coincident gate so that the simultaneous conditioning of a gate by a transistor of the frequency divider 101 and the application of an increased potential condition on lead 122 will cut off the associated left-hand and upper diodes and result in an actuation of the coincident gate to produce an increased potential condition either on a lead 144 or a lead 146.

In situations where the incoming signal impulse lags behind the operation of the impulse distributor 26 the period of operation of the univibrator 119 will occur during the time that one of the gates 131 to 133 is conditioned by the frequency divider 101, consequently there will be an increased potential condition impressed on lead 144. This increased potential is impressed on the base of a normally conducting transistor 147. Transistor 147 and a transistor 148 are cross coupled to form a binary circuit 149 having two stable states of equilibrium. When the positive pulse is impressed on the base of transistor 147 this transistor assumes a nonconductive state and the transistor 148 is placed in a state of heavy conduction. Conduction of transistor 148 is accompanied by a rise in its collector potential which is impressed through a differentiating condenser 151 but is blocked from further application by a diode 152. There is no further action at this time.

When the vertical B channel lead 52 in the matrix 17 is initially actuated which occurs once during each cycle of operation of the channel distributor 27, a positive going pulse is impressed over a lead 153, through a differentiating condenser 154 to the base of a normally conducting emitter follower transistor 156, driving this transistor towards a state of nonconduction. Transistor 156 and transistors 157, 158, 159, 160 and 161 are connected to form an energy storage type frequency divider of the type shown in the copending application of F. Biggam, Serial No. 551,820, filed December 8, 1955. Inasmuch as the positive going pulse applied to the transistor 156 is only of instantaneous duration, the transistor again assumes its conductive condition whereupon its emitter potential will drop to impress a decreased potential condition through a differentiating condenser 163 and a diode 164 to effectuate a negative charging of a storage condenser 166. The charge on condenser 166 increases the conductivity of the transistor 157 to cause the application of a decreased potential condition to the condenser 163. When subsequent negative pulses are impressed through the differentiating condenser 163, they are reenforced by this negative conditioning potential so that the condenser 166 is negatively charged in equal increments. After a predetermined number of operations of the vertical B channel lead 52 in the matrix 17 each of which supplies a pulse to reduce the conductivity of transistor 156, a charge is built up on the condenser 166 which is sufficient to impress a decreased potential condition through a diode 168 to the base of a normally nonconducting transistor 158. Transistor 158 and transistor 159 are coupled together to provide a binary circuit 169 having two stable states of equilibrium. The impression of the negative potential through the diode 168 results in the rendering of transistor 158 conducting and transistor 159 is placed in a state of nonconduction. The collector potential of transistor 159 thereupon drops to impress a negative going potential over a lead 171, through a differentiating condenser 172 to the base of the conducting transistor 148. However, since transistor 148 is already conducting, the receipt of this negative going potential is ineffective to change the state of the binary circuit 149.

During the time that transistor 158 in the binary 169 is conducting, the transistors 160 and 161 are also driven to a heavy state of conduction. It will be noted that the emitter of transistor 161 is connected to ground and also that the collector of this transistor is connected to the condenser 166 thereby providing a convenient discharge path for the condenser. The condenser thereupon discharges in preparation for another cycle of operation.

It will be noted that a contactor 173 is provided for movement to three contact positions so that condensers of different capacitance values may be connected in the frequency divider circuit and thus change the frequency of the output from this circuit. As different condensers are used the number of pulses required to build up a sufficient charge on the condenser 166 to operate the binary 169 also changes. When the contactor 173 is moved to its number 3 contact position, the binary 169 may be operated directly by pulses applied from the matrix over the lead 153.

Recalling that the binary 169 has been operated so that the transistor 158 is now conducting then the receipt of the next positive going pulse over the lead 153 is routed through a pair of by-pass diodes 174 and 176 and a differentiating condenser 177 to produce a positive going potential condition that is applied to the now conducting transistor 158. Transistor 158 is driven into a state of nonconduction and the binary 169 is restored to the condition shown in Fig. 4. This action is accompanied by an immediate rise in the potential on the collector of the transistor 159 and on the lead 171 which is impressed through the differentiating condenser 172 to cause the now conducting transistor 148 to assume a nonconducting state and as a result thereof the binary 149 is restored to the condition shown in Fig. 5. Immediately thereupon the collector potential of transistor 148 drops to apply a decreased potential condition through the differentiating condenser 151 and the diode 152 to the base of a normally nonconducting transistor 179.

Transistor 179 and the transistor 72 are cross coupled to form a univibrator circuit generally designated by the reference number 181. This univibrator has a period of operation which is determined by the capacitance value of a condenser 182. Suitable biasing potentials are provided to hold the transistor 72 in a normally conductive state when the univibrator is in a quiescent state. When the decreased potential is impressed on the base of transistor 179, the univibrator 181 will execute a cycle of operation. During this cycle of operation the transistor 72 is rendered nonconducting and as a result the collector potential thereof drops to apply a decreased potential condition over the lead 71 to the diode 69 of the coincident gate. It will be recalled that this coincident gate controls the application of oscillator pulses to the transistor 76 and hence to the frequency dividers 88, 94 and 101. While the univibrator 181 is executing a cycle of operation the decreased potential condition impressed on diode 69 causes the potential on the junction point 73 to be held at a low value consequently the operation of the transistor 67*a* during this period is ineffective to apply a positive pulse to the transistor 76.

It may be understood that by properly selecting the value of the capacitance for the condenser 182 so that the period of operation of the univibrator 181 is equal to the period of operation of the frequency divider 67, then the operation of the univibrator will be effective to preclude the application of one driving pulse to the frequency divider 88. This action obviously results in a delay in not only the frequency divider 88 but also the frequency dividers 94 and 101 as well as the impulse distributor 26. Inasmuch as the period of operation of the impulse distributor 26 is delayed the subsequent operation of the impulse distributor will be more nearly in synchronism with the subsequent received signal impulses.

This mode of operation of the synchronizer will be repeated as long as the signal impulses lag the frequency of operation of the distributor 26. Pulses are not continually subtracted when the incoming signal impulses lag the frequency of operation of the impulse distributor because the drift in synchronization has been found to be at a very slow rate. A correction once in several operations of the matrix is adequate to maintain complete synchronization.

In situations where the frequency of the received signal impulses is found to lead the frequency of operation of the signal impulse distributor 26, it is necessary to add drive pulses to speed up the frequency of operation of the signal impulse distributor. In such a situation the space to mark signal impulse transition impressed on lead 10 will occur before the transistor 101*a* is operated and during the time that one or more of the transistors 101*e*, 101*f* and 101*g* are operated. As a result the univibrator 119 will execute a cycle of operation during the time that conditioning potential is impressed on one or more of the gates 141, 142 and 143. Upon simultaneous impressions of increased potential conditions to any associated left-hand and upper diodes in these coincident gating circuits, an increased potential condition is impressed through the associated right-hand diode to the lead 146. This increased potential condition is impressed through a condenser 186 to the base of a normally conducting transistor 187. Transistor 187 and a quiescent transistor 188 are connected together and to suitable biasing potentials to form a binary circuit 189 having two stable states of equilibrium. The appearance of positive going pulses on the base of transistor 187 effectuates an operation of the binary circuit 189 so that the transistor 187 assumes a non-conductive state and its collector potential drops. This drop in collector potential is impressed through a differentiating condenser 191 but is blocked by a diode 192.

Pulses are again received over the lead 153, each time the B channel lead 52 is conditioned, to operate the energy type frequency divider including the binary 169. When the binary 169 is restored to its initial condition following a cycle of operation of the frequency divider, a rise in potential is impressed over the lead 171 to a differentiating condenser 193 wherein a positive going pulse is produced and applied to the base of the now conducting transistor 188. The binary 189 will thereupon restore to the condition shown in Fig. 5 and the accompanying rise in the collector potential of transistor 187 is impressed through the differentiating condenser 191 and the diode 192 to the base of a normally nonconducting NPN type transistor 194. Transistor 194, the transistor 81 and the coupling connections therebetween form another univibrator 196 having a period of operation determined by the capacitance value of a condenser 197. The appearance of the positive potential on the base of transistor 194 causes the univibrator 196 to execute a cycle of operation and when the transistor 81 is cut off during this operation, the collector potential of transistor 81 rises to impress an increased potential condition on the lead 79 to the diode 78.

It is to be recalled that previous applications of a low potential to the diode 78 precluded the application of drive pulses from the collector of transistor 67*c* to the base of the transistor amplifier 76. If a value of capacitance is selected for the condenser 197 so that the period of operation of the univibrator 196 is equal to the period of operation of the frequency divider 67 then it is apparent that the operation of the transistor 67*c* will effectuate an impression of a positive potential through the coincident gate to the base of the transistor 76. Now during the cycle of operation of the frequency divider 67 the transistor 76 is driven towards a state of nonconduction two times and as a result two drive pulses instead of one are impressed over the lead 83 to speed up the operation of the frequency dividers 88, 94 and 101 as well as the impulse distributor 26. Inasmuch as the signal impulse distributor 26 is speeded up it will tend to catch up to the speed of the signal impulses to again restore the synchronous operation of the system. Again it is to be understood that additional drive pulses are generated only after a predetermined number of cycles of operation of the matrix 17 in order that the correction proceed at a very slow rate which is comparable to the drift of the frequency of the oscillator 66.

When it is desired to effectuate corrections more rapidly or slowly, the value of capacitance of the storage condenser 166 is accordingly changed. Fairly rapid corrections can be made by moving the contactor 173 to the number 3 position whereupon each transition from a spacing to marking condition during operation of the B channel lead 52 in the matrix 17 will effectuate an operation of the correction circuits. Further, it may be comprehended that more than one drive pulse may be added or subtracted by merely increasing the capacitance value of the coupling condensers 182 and 197 to give the univibrators 181 and 196, respectively greater periods of operation so as to span more than one cycle of operation of the frequency divider 67.

In summarizing the operation of the correction circuits, frequent reference should be had to the timing diagram shown in Fig. 7. In order to simplify the description assume that the contactor 173 is moved into the number 3 position then the binary 169 will be operated during each cycle of operation of the matrix. In case 1 a perfect signal impulse is shown on lead 10 and it will be noted that the univibrator 119 executes a cycle of operation during the time that the transistor 101*a* is operating, consequently none of the correction gates 131 to 133 and 141 to 143 is operated. In such a situation each cycle of operation of the frequency divider 67 causes one drive pulse to be impressed on the frequency divider 88.

In case 2 the frequency of the signal impulses is lagging behind the frequency of the impulse distributor 26 and as a consequence the operation of the univibrator 119 coincides with the operation of the transistor 101*b* in the frequency divider 101. The gating circuit 131 is operated to set the binary 149 in condition to be operated by a receipt of a positive going pulse over lead 171 from the binary 169. Restoration of the binary 149 to the condition shown in Fig. 5 effectuates the operation of the univibrator 181 thereby providing a conditioning potential to the diode 69 which will function to preclude the application of a pulse, resulting from the operation of the transistor 67*a*, to the transistor 76. A drive pulse is therefore deleted from the train of drive pulses normally applied to the frequency divider 88 and as a result thereof the speed of operation of the frequency dividers 94 and 101 as well as the impulse distributor 26 is slowed down. This cycle of operation is repeated during each cycle of operation of the matrix 17 until such time as the pulse from the univibrator 119 coincides with the operation of the transistor 101*a*.

Considering case 3, where the signal impulses lead the frequency of operation of the signal impulse distributor 26; the pulse generated by the univibrator 119 will now occur during the time that the transistor 101*g* is operated consequently the gate 143 delivers a pulse over lead 146 to operate the binary 189. When the B channel lead 52 in the matrix 17 has an increased potential applied thereto the binary 169 is set in a condition opposite to that shown in Fig. 4. When the increased potential condition is removed from lead 52 the binary 169 is restored to the condition shown in Fig. 4 and as a result thereof a positive going pulse is applied over the lead 171 to restore the binary 189 to the condition shown in Fig. 5. Restoration of the binary 189 is followed by an actuation of the univibrator 196. During operation of the univibrator conditioning potential is impressed over the lead 79 to the diode 78 to condition the gating circuit to allow an additional drive pulse to be applied from the collector of the transistor 67*c* to the base of the transistor 76. This additional pulse drives the transistor 76 towards a state of non-conduction and as a result an additional drive pulse is applied to the frequency divider 88. This action speeds up the operation of not only the frequency divider 88 but ultimately the speed of operation of the frequency dividers 94 and 101 as well as the impulse distributor 26. This correction will be effected during each cycle of operation of the matrix until such time as synchronism is again restored which is evidenced by the operation of the univibrator 119 during the time that the transistor 101*a* is operated.

When the system is initially placed in operation, it is necessary that facilities be provided to phase each received signal impulse with the operation of the appropriate coincident gating circuit in the matrix 17. This is accomplished by transmitting a test pattern of signals over the B channel so that a recording device connected to the cable 22 will print the test message. If the test message is improperly recorded then a push button 201 is depressed to complete an obvious circuit to an electromagnet 202 that effectuates the drawing up of a number of contactors 203, 204, 205 and 206. Closure of contactor 205 with its upper contact completes a circuit from the B channel lead 52, over a lead 207, through a diode 208, through a normally conducting emitter follower transistor 209, through the now drawn up contactor 205, through a differentiating condenser 211 to the base of a normally conducting transistor 212. This transistor 212 and a transistor 213 are coupled together and biased to form a binary circuit 214. When the B channel lead 52 is initially energized an increased potential is impressed over lead 207 to drive transistor 209 towards a state of nonconduction. This action is accompanied by a rise in emitter potential which is impressed through the contactor 205 and the differentiating condenser 211 to the base of the transistor 212 causing this transistor to assume a nonconductive state. Immediately thereupon the transistor 213 assumes a conductive state and its collector potential rises to impress an increased potential over a lead 216, through the now drawn up contact 204, over a lead 217, through the diode 218 and a differentiating condenser 219 to a junction point 221.

It will be noted that this junction point is connected in the ringing circuit 104 that supplies positive pulses to drive the impulse distributor, consequently the appearance of this additional positive voltage spike will effectuate a nonconduction of the transistor 106 whereupon its collector potential drops to advance the conductive stage in the impulse distributor 26. The push button 201 is then released to de-energize the magnet 202 whereupon the next positive pulse received from the B channel lead 52 is passed through the contactor 205 now in engagement with its lower contact and from there to the base of the now conducting transistor 213 of the binary 214. Binary 214 immediately restores to the condition shown in Fig. 4. The operation of the push button 201 is continued until such time as the recording apparatus connected to cable 22 is printing the test message, thereby indicating that an in phase condition exists between the incoming signal impulses and the operation of the coincident gates in the matrix 17.

Energization of magnet 202 draws up the contactor 203 to remove the condenser 166 from the frequency divider circuit consequently the binary 169 is operated during each cycle of operation of the matrix 17. Energization of magnet 202 also effectuates the drawing up of the contactor 206 to connect a condenser 222 in parallel with the condenser 197. It is to be remembered that condenser 197 determined the period of operation of the univibrator 196 which in turn was effective to add additional drive pulses to restore synchronization. Now with the condenser 222 connected in parallel with the condenser 197, the univibrator 196 will execute a prolonged cycle of operation resulting in the application of positive potential to the diode 78 for a period of time which is greater than the period of time required for the frequency divider 67 to execute a single cycle of operation. This feature provides a means for insuring the operation of the synchronizing corrector circuit when the univibrator operates at a time during which both the transistors 101*d* and 101*e* are operated. If such a situation existed then both the gating circuit 133 and 141 would be operated and as a result the drive pulses resulting from the operation of transistor 67*a* would be subtracted and the drive pulses resulting from the operation of transistor 67*c* would be added. The net result would be that there would be no correction imparted to the operation of the frequency dividers. However, when the condenser 222 is connected in the univibrator circuit 196 then this univibrator will execute a prolonged cycle of operation to insure that additional drive pulses are added until such time as the output of the univibrator 119 coincides with the operation of the transistor 101*a*.

It is to be understood that the above-described arrangement of circuits, frequency dividers, and other elemental parts is simply illustrative of an application of the principles of the invention and many other modifications may be made without departing from the invention. More particularly, stages could be removed or added to the channel distributor 27 to provide for one, two, three or more, channel operations. Further stages could be added or subtracted from the frequency divider circuits to provide for slower or faster operation of the receiving apparatus.

What is claimed is:

1. In an apparatus for synchronizing a local receiving device with incoming signals, a frequency divider for operating said local device, a source of constant frequency pulses for driving said frequency divider, means for adding drive pulses, means for subtracting drive pulses, means for comparing said received signals with the operation of the frequency divider, and means actuated by said comparing means in response to an out of synchronous operation for actuating said adding or subtracting means to restore synchronous operation.

2. In an apparatus for synchronizing a local receiving distributor with respect to incoming signals, a frequency divider for driving the receiving distributor, a source of constant frequency pulses for operating the frequency divider, a control circuit adapted to add or subtract operating pulses, means actuated by an out of synchronous condition between the distributor and the incoming signals for conditioning the control circuit for operation, and a second frequency divider actuated by the distributor for actuating the conditioned control circuit to add or subtract operating pulses to restore synchronization.

3. In an apparatus for synchronizing a local receiving device with respect to incoming signals, a frequency divider for operating the receiving device, a source of constant frequency pulses for driving the frequency divider, means responsive to an incoming signal for generating a first comparison pulse of precise width, means controlled by the frequency divider for generating a series of second comparison pulses each of said precise width, means for effectuating a comparison between each first comparison pulse and said series of second comparison pulses, and means actuated by the coincidence of the first comparison pulse and certain of said second comparison pulses for adding a drive pulse to the frequency divider.

4. In an apparatus for synchronizing a local receiving device with respect to incoming signals, a frequency divider for operating the receiving device, a source of constant frequency pulses for driving the frequency divider, means responsive to an incoming signal for generating a comparison pulse of precise width, means controlled by the frequency divider for generating a series of second comparison pulses each of said precise width, means for effectuating a comparison between each first pulse and said series of second comparison pulses, and means actuated by the coincidence of the first comparison pulse and certain of said second comparison pulses for subtracting a drive pulse from the pulses being applied to the frequency divider.

5. In a system for synchronizing a local telegraph receiving apparatus with respect to a series of incoming permutatively arranged marking and spacing telegraph signals, a multistage frequency divider for operating the receiving apparatus in concordance with the received telegraph signals, a source of constant frequency pulses for driving frequency divider, means responsive to a transition in the incoming signal for producing a comparing pulse of predetermined width, means for comparing said comparing pulse with the output of each stage of the frequency divider, and means responsive to a coincidence between said comparing pulse and predetermined stages of said frequency divider for adding drive pulses.

6. In a system for synchronizing a local telegraph receiving apparatus with respect to a series of incoming permutatively arranged marking and spacing telegraph signals, a multistage frequency divider for operating the receiving apparatus in concordance with the received telegraph signals, a source of constant frequency pulses for driving the frequency divider, means responsive to a transition in the incoming signal for producing a comparing pulse of predetermined width, means for comparing said comparing pulse with the output of each stage of the frequency divider, and means responsive to a coincidence between said comparing pulse and predetermined stages of said frequency divider for subtracting drive pulses.

7. In a synchronization system, means for receiving signals, a local device to be operated in synchronism with the receipt of the signals, a frequency divider for applying drive pulses to operate the local device, a source of constant frequency pulses, a subtract gating circuit for applying said generated pulses to said frequency divider, an add gating circuit for precluding the application of said pulses to said frequency divider, means for comparing the incoming signal with the drive pulses of the frequency divider, means actuated by an advance of the signal with respect to the drive pulse for actuating the add gating circuit to allow an additional generated pulse to be applied to the frequency divider, and means actuated by a retardation of the signal with respect to the drive pulse for actuating the subtract gate to preclude one of the generated pulses from being applied to the frequency divider.

8. In a synchronization system, means for receiving signals that are maintained in synchronism with the operation of a local device, means for generating a series of pulses, a frequency divider adapted to operate said local device, a pair of gating circuits interconnecting said generating means and said frequency divider, means for biasing one of said gating circuits to permit the application of said generated pulses to said frequency divider, means for biasing the other of said gating circuits to preclude the application of said generated pulses to said frequency divider, means operated by a predetermined change in the received signal for producing a first comparing pulse of predetermined width, means actuated by the frequency divider for producing a predetermined number of second comparing pulses of the same width as the first comparing pulse, means actuated by a coincidence of a first comparing pulse with a first group of said second comparing pulses for rendering the first gating circuit incapable of passing a generated pulse to the frequency divider, and means actuated by a coincidence of a first comparing pulse with a second group of said comparing pulses for rendering the second gating circuit operative to pass a generated pulse to the frequency divider.

9. In a device for synchronizing a local device with incoming signals, a constant frequency means for producing a continuous train of pulses, a frequency divider actuated by said train of drive pulses for operating said local device, a first univibrator, a first gating circuit conditioned by said univibrator for passing said drive pulses to operate said frequency divider, a second univibrator, a second gating circuit conditioned by said second univibrator to preclude passage of said drive pulses, means actuated by a first out of synchronous condition between the received signals and the operation of the local device for actuating the first univibrator to preclude the first gating circuit from passing the drive pulses, and means actuated by a second out of synchronous condition between the received signals and the operation of the local device for actuating the second univibrator to permit the second gating circuit to pass the drive pulses.

10. In a multiplex telegraph receiving apparatus, a multistage impulse distributor, a multistage channel distributor, a matrix means under the cojoint control of the impulse and channel distributors for routing the incoming signals to receiving devices, a multistage frequency divider having one driving stage for operating the impulse distributor in concordance with the incoming signals, a pulsing means for applying pulses to drive the frequency divider, means controlled by one stage of the impulse distributor for driving the channel distributor, means actuated by an incoming signal for generating a first comparison pulse, gating means controlled by the nondriving stages of the frequency divider for effectuating a comparison with the first comparison pulse, a control circuit for adding or subtracting drive pulses for the frequency divider, and means operated by the operation of the gating means and the operation of one stage of the channel distributor for operating the control circuit.

11. In a multiplex telegraph receiver, a channel distributor, an impulse distributor having facilities for driving the channel distributor, a frequency divider for driving the impulse distributor, a pulsing means for actuating the frequency divider, a pair of gating circuits for controlling the application of drive pulses to the frequency divider, a control circuit for conditioning a first of the gating circuits to preclude the passage of drive pulses thereto, means responsive to an out of synchronous condition between the received signals and the operation of the impulse distributor for actuating the control circuit to permit the first gating circuit to pass an additional drive pulse, auxiliary means controlled by the channel distributor for applying a pulse to drive the impulse distributor, and means actuated by an out of synchronous condition and said auxiliary means for actuating the control circuit to permit more than one drive pulse to pass through the first gating circuit.

12. In a system for maintaining a receiving distributor in synchronism with incoming telegraph signals, a multistage frequency divider for driving the receiving distributor, a source of constant frequency pulses, a pair of gating circuits for applying said pulses to drive the frequency divider, a first univibrator circuit for biasing a first gating circuit to permit the passage of drive pulses, a second univibrator circuit for biasing the second gating circuit to block the passage of drive pulses, a third univibrator circuit actuated by an incoming signal for producing a first comparing pulse having a duration equal to the time that one of the stages of the frequency divider is operated, first means for detecting a coincidence between the first comparison pulse and predetermined number of stages of the frequency divider, means actuated by said first detecting means for actuating the first univibrator circuit whereby the associated gating circuit deletes a drive pulse, second means for detecting a coincidence between the first comparison pulse and another predetermined number of stages of the frequency divider, and means actuated by said second detecting means for operating the second univibrator circuit whereby the associated gating circuit adds a drive pulse.

References Cited in the file of this patent

UNITED STATES PATENTS

| | | |
|---|---|---|
| 2,622,153 | Schuler | Dec. 16, 1952 |
| 2,671,132 | Shenk et al. | Mar. 2, 1954 |
| 2,776,418 | Townsend | Jan. 1, 1957 |